United States Patent [19]

Chambers

[11] Patent Number: 5,152,892
[45] Date of Patent: Oct. 6, 1992

[54] SPIRAL FILTER ELEMENT

[75] Inventor: John Chambers, Wiltshire, United Kingdom

[73] Assignee: Cross Manufacturing Company (1938) Limited, Bath, England

[21] Appl. No.: 689,757
[22] PCT Filed: Aug. 14, 1990
[86] PCT No.: PCT/GB90/01274
  § 371 Date: May 21, 1991
  § 102(e) Date: May 21, 1991
[87] PCT Pub. No.: WO91/02578
  PCT Pub. Date: Mar. 7, 1991

[30] Foreign Application Priority Data

Aug. 15, 1989 [GB] United Kingdom ............... 8918581

[51] Int. Cl.⁵ ............................................. B01D 29/48
[52] U.S. Cl. ............................ 210/493.4; 210/497.1; 29/163.7; 29/163.8
[58] Field of Search ................ 210/493.4, 497.1; 29/163.7, 163.8

[56] References Cited

U.S. PATENT DOCUMENTS

| | | |
|---|---|---|
| 1,642,864 | 9/1927 | Williams . |
| 2,342,669 | 2/1944 | Hoffman . |
| 2,383,672 | 8/1945 | Neisingh . |
| 3,427,931 | 2/1969 | Wainberg . |
| 3,542,197 | 11/1970 | Rosaen . |
| 3,937,281 | 2/1976 | Harnsberger . |
| 3,975,274 | 8/1976 | Nommensen . |
| 4,199,454 | 4/1980 | Sartare ............ 210/497.1 |
| 4,227,576 | 10/1980 | Calderon . |
| 4,430,232 | 2/1984 | Doucet . |
| 4,742,872 | 5/1988 | Geske ............. 210/497.1 |

FOREIGN PATENT DOCUMENTS

| | | |
|---|---|---|
| 0057670 | 8/1982 | European Pat. Off. . |
| 0262398 | 4/1988 | European Pat. Off. . |
| 608959 | 2/1935 | Fed. Rep. of Germany ... 210/497.1 |
| 3522725 | 1/1987 | Fed. Rep. of Germany ... 210/497.1 |
| 919340 | 3/1947 | France . |
| 1084045 | 4/1984 | U.S.S.R. ................. 210/497.1 |
| 1214155 | 2/1986 | U.S.S.R. ................. 210/497.1 |
| 30303 | 5/1910 | United Kingdom ......... 210/497.1 |
| 450534 | 7/1936 | United Kingdom . |
| 556012 | 9/1943 | United Kingdom . |
| 600820 | 4/1948 | United Kingdom . |
| 734635 | 8/1955 | United Kingdom . |
| 841067 | 7/1960 | United Kingdom . |
| 958148 | 5/1964 | United Kingdom . |
| 1300885 | 12/1972 | United Kingdom . |
| 2093982 | 9/1982 | United Kingdom . |
| 2126915 | 4/1984 | United Kingdom . |
| 2136307 | 9/1984 | United Kingdom . |
| 2145217 | 3/1985 | United Kingdom . |
| 2160118 | 12/1985 | United Kingdom . |

Primary Examiner—Robert A. Dawson
Assistant Examiner—W. L. Millard
Attorney, Agent, or Firm—Young & Thompson

[57] ABSTRACT

A filter element generally indicated at 10 comprising a spring 11 whose coils are so formed that the filter gaps 12 progressively increase in size from one end 13 of the coil to the other end 14. The increase in the size of the gaps is carefully chosen so that the available deflection for any coil section, when the spring is vertically orientated, is sufficient to develop an upward force which can support the coils in the spring 11 which extend above that particular coil section. Similar results can be achieved by varying the resilience or stiffness characteristics through the filter element.

11 Claims, 1 Drawing Sheet

SPIRAL FILTER ELEMENT

This invention relates to filter elements.

There have been a number of proposals over the years for filter elements configured as springs. One of the attractions of such elements is that they can be extended on backwash to allow an increase in the filter gaps and hence easy release of trapped material. Such elements work extremely well when disposed with their longitudinal axis generally horizontal, but problems arise when it is desirable to use the springs in a generally vertical orientation, because the weight of the upper part of the spring tends to prevent the lower part of the spring opening.

It is not possible to overcome this problem simply by making the spring stiffer, because then it will not readily close to and maintain design filter gaps during normal flow.

The present invention consists in a filter element comprising a spring defining filter gaps between adjacent coil sections, the spacing between the coil sections increasing progressively, when viewed not under load, from one end to the other such that when the spring is orientated vertically with the one end above the other the spacing between any pair of adjacent coil sections is sufficient to allow that part of the spring to support the weight of the coils above.

Thus put another way the invention consists in a spring being so manufactured that each coil can support the coils above it. From a manufacturing point of view clearly the spacing arrangement set out above is the most easily achieved, but the invention includes, for example, manufacturing different sections of the filter element from materials with different stiffness and resilience characteristics.

In a preferred form of the invention the spacing between any pair of adjacent coils is such that the pair of coils develops an overall upward force on the coils above. This force arises because the spacing determines the degree of deflection of the coil sections which can occur before it locks up on the coil sections below and the extent of deflection determines the upward force.

When the spring is arranged vertically the gaps between the coil sections are preferably substantially equal along a length of the spring and the coil sections preferably have longitudinally directed projections for defining a minimum gap.

Although the invention has been defined above it is to be understood that it includes any inventive combination of the features set out above or in the following description.

The invention may be performed in various ways and a specific embodiment will now be described, by way of example, with reference to the accompanying drawings, in which FIG. 1 is a side view of a spring in a horizontal orientation;

Figure 1:
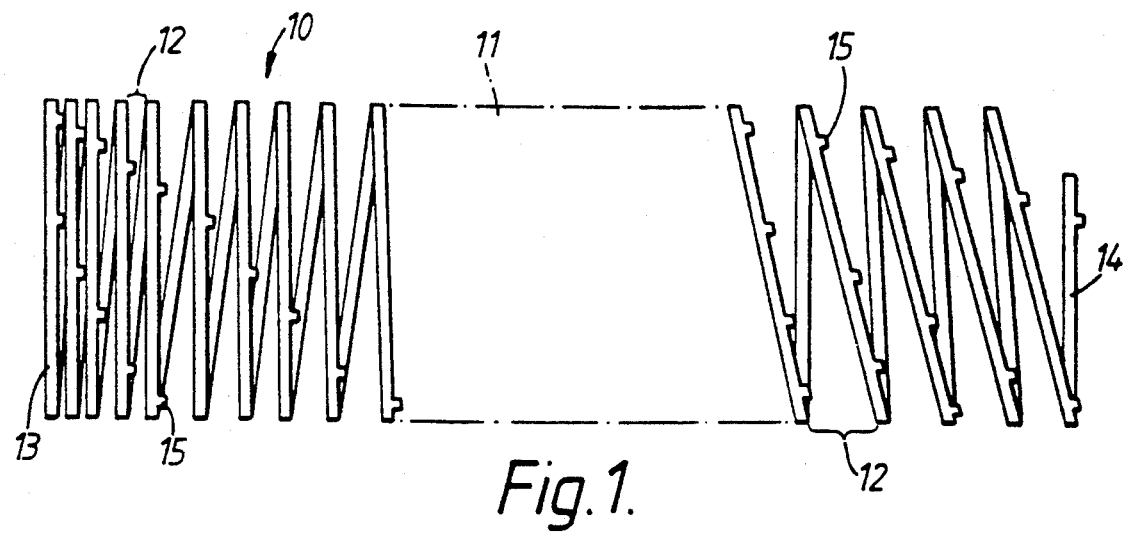
Figure 2:
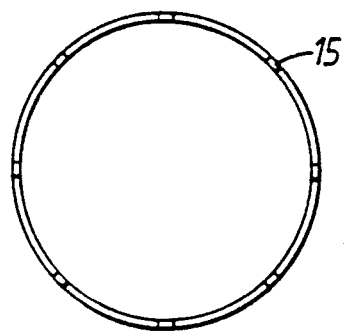
FIG. 2 is an end view of the spring.
Figure 3:
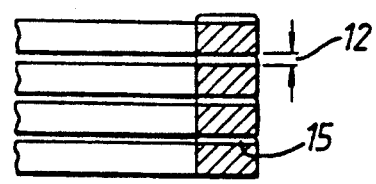
FIG. 3 is a detailed cross-section of one side of the filter element in a vertical orientation.

Thus in FIG. 1 a filter element generally indicated at 10 comprises a spring 11 whose coils are so formed that the filter gaps 12 progressively increase in size from one end 13 of the coil to the other end 14. The increase in the size of the gaps is carefully chosen so that the available deflection for any coil section, when the spring is vertically orientated, is sufficient to develop an upward force which can support the coils in the spring 11 which extend above that particular coil section. Ideally each coil section develops just over the necessary force so that the spring is "lively".

With a careful selection of spacing the filter element 10 can be constructed so that when arranged vertically the gaps 12 are substantially equal along the length of the spring 11; the minimum gap being defined by projections 15.

When the filter element 10 is extended on backwash the spring 11 will open substantially equally along its length, because the construction of the spring overcomes the effect of the coil weight.

I claim:

1. In an element for filtering a fluid comprising a spring having a plurality of coil sections disposed such that adjacent coil sections define filter gaps between them when the spring is orientated vertically with one end above the other, the improvement comprising the spring being so constructed that, when orientated horizontally and unstressed, the natural spacing between the coils increases progressively from said one end to said other end so that when the spring is orientated in the vertical position each coil section is sufficiently deflectable to develop an overall upward force on the coils above.

2. An element according to claim 1, wherein the spring is so constructed that when in the vertical position and unstressed and uncompressed the gaps are substantially equal along the length of the spring.

3. An element according to claim 1, wherein the coil sections have longitudinally directed projections for defining a minimum gap in the event of the spring being compressed.

4. In an element for filtering a fluid comprising a spring having a plurality of coil sections disposed such that adjacent coil sections define filter gaps between them when the spring is orientated vertically with one end above the other, the improvement comprising the spring being so constructed that, when orientated horizontally and unstressed, the natural spacing between the coils increases progressively from said one end to said other end so that when the spring is axially stretched and vertically orientated the gaps between the coil sections are substantially equal along the length of the spring.

5. An element according to claim 4, wherein the spring is so constructed that when in the vertical position and unstressed and uncompressed the gaps are substantially equal along the length of the spring.

6. An element according to claim 4, wherein the coil sections have longitudinally directed projections for defining a minimum gap in the event of the spring being compressed.

7. An element for filtering a fluid comprising a spring constructed with the stiffness of its coils changing progressively along the length of the spring such that, when the spring is orientated vertically, each coil develops an overall upward force on the coils above.

8. An element for filtering a fluid comprising a spring constructed with the resilience of its coils changing progressively along the length of the coil such that, when the spring is orientated vertically, each coil develops an overall upward force on the coils above.

9. An element for filtering a fluid comprising a spring constructed such that, when orientated horizontally and unstressed, the spacing between coils changes progressively along the length of the coil and such that when the spring is orientated vertically, each coil section develops an overall upward force on the coils above.

10. An element according to claim 2, wherein the coil sections have longitudinally directed projections for defining a minimum gap in the event of the spring being compressed.

11. An element according to claim 5, wherein the coil sections have longitudinally directed projections for defining a minimum gap in the event of the spring being compressed.

* * * * *